US012785335B2

(12) United States Patent
Sung

(10) Patent No.: US 12,785,335 B2
(45) Date of Patent: Nov. 3, 2026

(54) FUSE CARRYING MECHANSIM AND CONNECTOR ASSEMBLY

(71) Applicant: BELLWETHER ELECTRONIC CORP., Taoyuan City (TW)

(72) Inventor: Tai-Ching Sung, Taoyuan City (TW)

(73) Assignee: BELLWETHER ELECTRONIC CORP., Taoyuan City (TW)

( * ) Notice: Subject to any disclaimer, the term of this patent is extended or adjusted under 35 U.S.C. 154(b) by 384 days.

(21) Appl. No.: 18/444,732

(22) Filed: Feb. 18, 2024

(65) Prior Publication Data

US 2025/0158337 A1 May 15, 2025

(30) Foreign Application Priority Data

Nov. 10, 2023 (TW) ................................ 112212184

(51) Int. Cl.
*H01R 13/692* (2011.01)
*H01H 85/02* (2006.01)
*H01H 85/20* (2006.01)

(52) U.S. Cl.
CPC ....... *H01R 13/692* (2013.01); *H01H 85/0208* (2013.01); *H01H 85/2015* (2013.01)

(58) Field of Classification Search
CPC ............. H01R 13/692; H01H 85/0208; H01H 85/2015
USPC ....................................... 439/620.26, 620.28
See application file for complete search history.

(56) References Cited

U.S. PATENT DOCUMENTS 2,091,452 A * 8/1937 Ramsey ............... H01H 31/122 337/195
2025/0158338 A1* 5/2025 Sung .................... H01H 85/202

FOREIGN PATENT DOCUMENTS

CN 209183780 U 7/2019

* cited by examiner

*Primary Examiner* — Hae Moon Hyeon
(74) *Attorney, Agent, or Firm* — Li & Cai Intellectual Property Office

(57) ABSTRACT

A fuse carrying mechanism thereof is provided. The fuse carrying mechanism includes at least one conductive component and at least one movable component. The conductive component includes an accommodating slot. A part of the movable component is movably connected to the conductive component, the movable component includes an abutting structure. When the fuse is arranged in the accommodating slot, and the movable component is arranged in the limiting position, the abutting structure abuts against the accommodating slot such that at least part of the accommodating slot elastic is deformed inward.

16 Claims, 13 Drawing Sheets

FUSE CARRYING MECHANSIM AND CONNECTOR ASSEMBLY

CROSS-REFERENCE TO RELATED PATENT APPLICATION

This application claims the benefit of priority to Taiwan Patent Application No. 112212184, filed on Nov. 10, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a fuse carrying mechanism and a connector assembly, and more particularly to a fuse carrying mechanism and a connector assembly for being assembled and disassembled in a tool-free manner.

BACKGROUND OF THE DISCLOSURE

A conventional connector having a fuse, such as a bus bar connector implemented in servers, can be used to protect other related electronic components. In practical applications, in order to ensure better conductive contact with the fuse, it is common for the conventional connectors to be connected by bolts. However, this manner of connection for the conventional connectors causes the fuse to be difficult to disassemble.

SUMMARY OF THE DISCLOSURE

In response to the above-referenced technical inadequacy, the present disclosure provides a fuse carrying mechanism and a connector assembly mainly for improving on the issues associated with the conventional connectors that are difficult to disassemble or replace.

In order to solve the above-mentioned problems, one of the technical aspects adopted by the present disclosure is to provide a fuse carrying mechanism, which includes at least one conductive component and at least one movable component. The at least one conductive component has an accommodating slot. A part of the movable component is movably connected to the conductive component, and the movable component includes an abutting structure. When a fuse is arranged in the accommodating slot and the movable component is arranged at a limiting position, the abutting structure abuts against the accommodating slot such that at least part of the accommodating slot is inwardly and elastically deformed.

In order to solve the above-mentioned problems, another one of the technical aspects adopted by the present disclosure is to provide a connector assembly. The connector assembly includes a connector and a fuse carrying mechanism that is connected to the connector. The connector includes an insulating base, a plurality of connection cables, and two connection terminal assemblies that are disposed in the insulating base. The two connection terminal assemblies are spaced apart from each other and electrically isolated from each other, and one of the two connection terminal assemblies is electrically connected to at least one of the connection cables. The fuse carrying mechanism includes two conductive components and a movable component. Another one of the two connection terminal assemblies is connected to one of the two conductive components, another one of the two conductive components is connected to the other ones of the connection cables, and each of the two conductive components has an accommodating slot. The movable component includes an abutting structure. When two ends of a fuse are respectively arranged in the accommodating slots of the two conductive components and the movable component is arranged at a limiting position, the abutting structure abuts against the accommodating slots such that at least part of each of the accommodating slots is inwardly and elastically deformed.

Therefore, in the fuse carrying mechanism and the connector assembly provided by the present disclosure, through the mutual cooperation between the accommodating slot of the conductive component and the abutting structure of the movable component, it can be ensured that the fuse is held stably when being arranged in the accommodating slot, so that the fuse can perform its function normally. In addition, the fuse carrying mechanism and the connector assembly of the present disclosure can allow the user to, through the manipulation of the movable component, easily move the fuse out of the accommodating slot.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
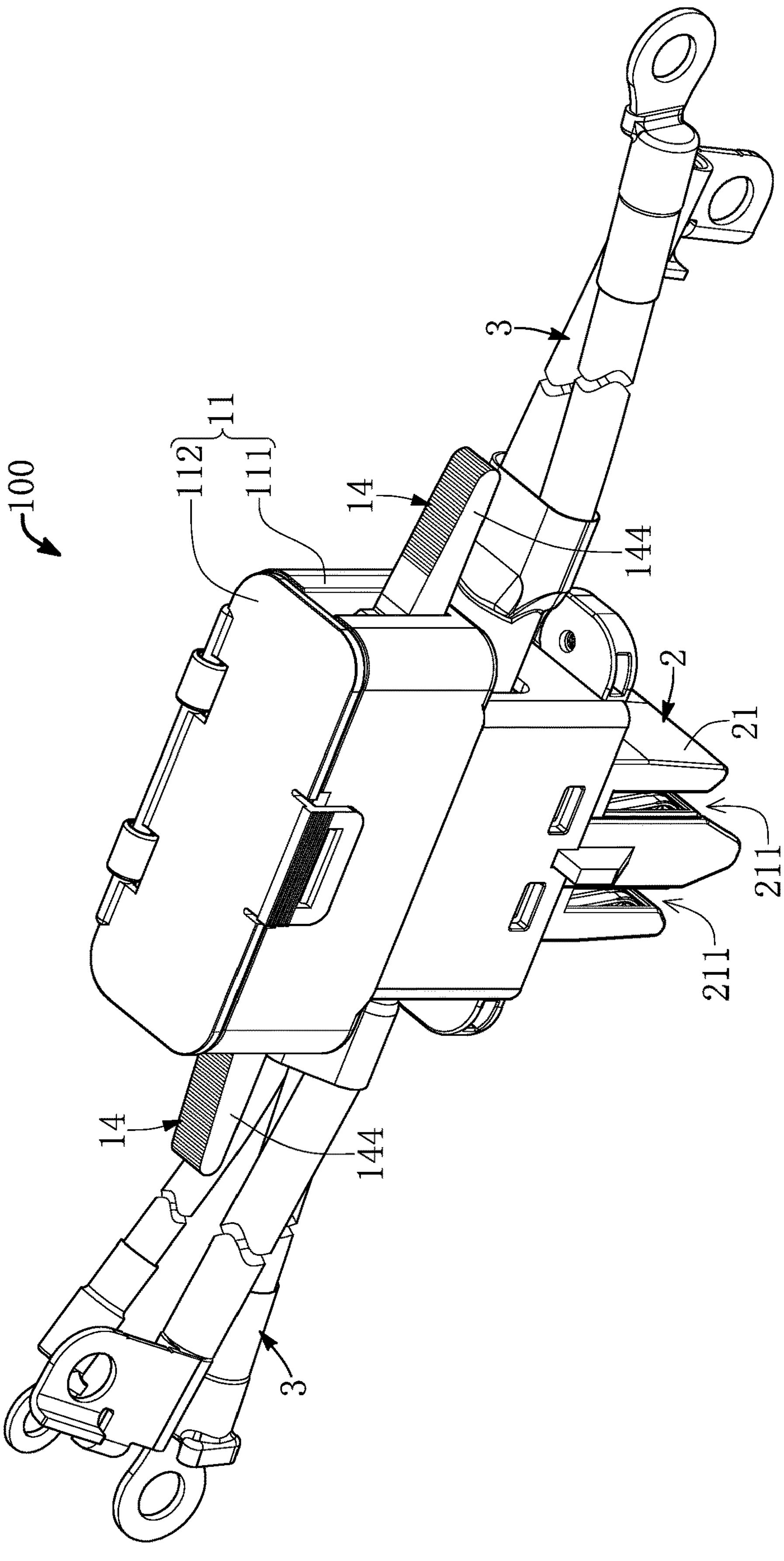
FIG. 1 is a schematic view of a connector assembly having a cover body being closed according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
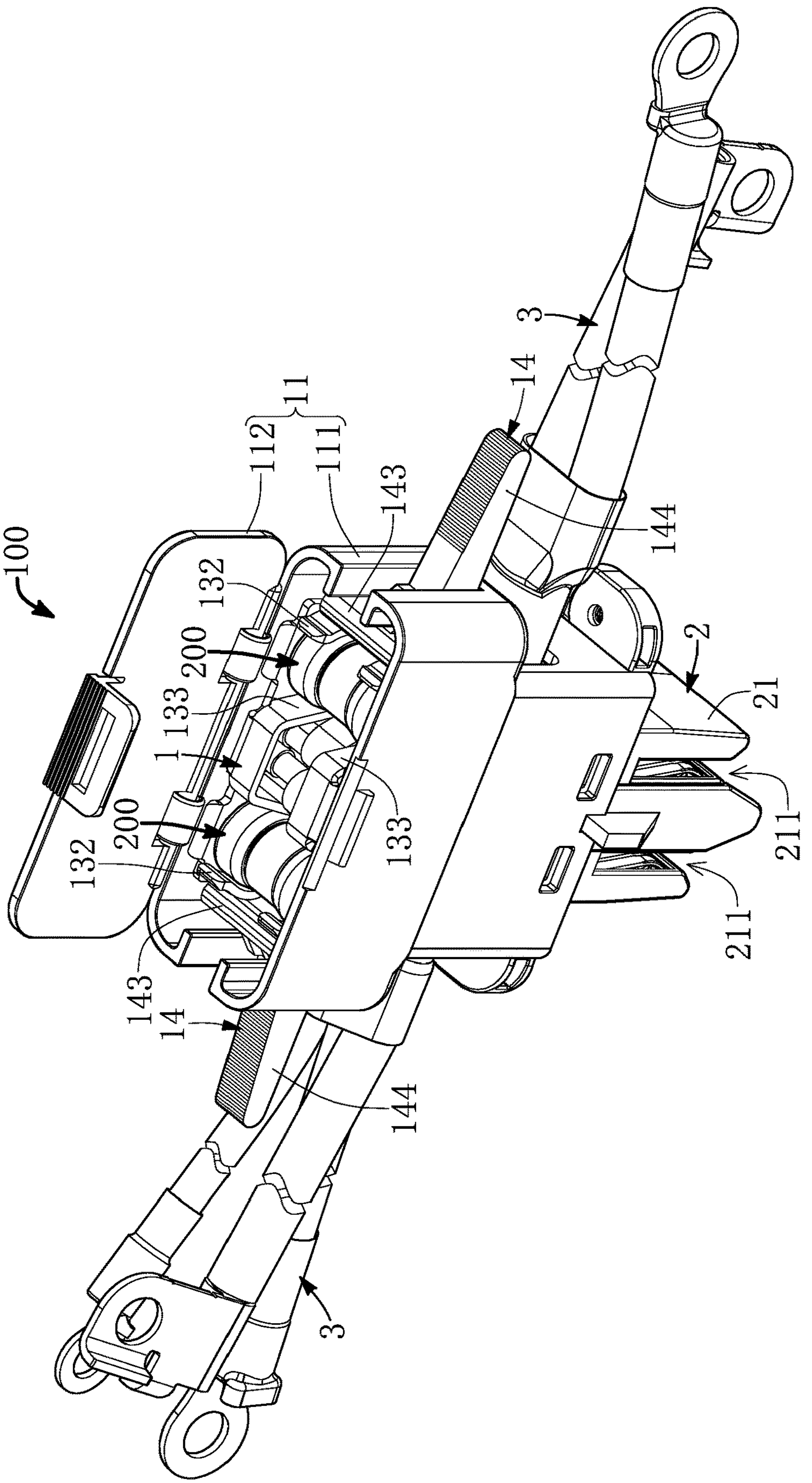
FIG. 2 is a schematic view of the connector assembly having the cover body being open according to the present disclosure.
Figure 3:
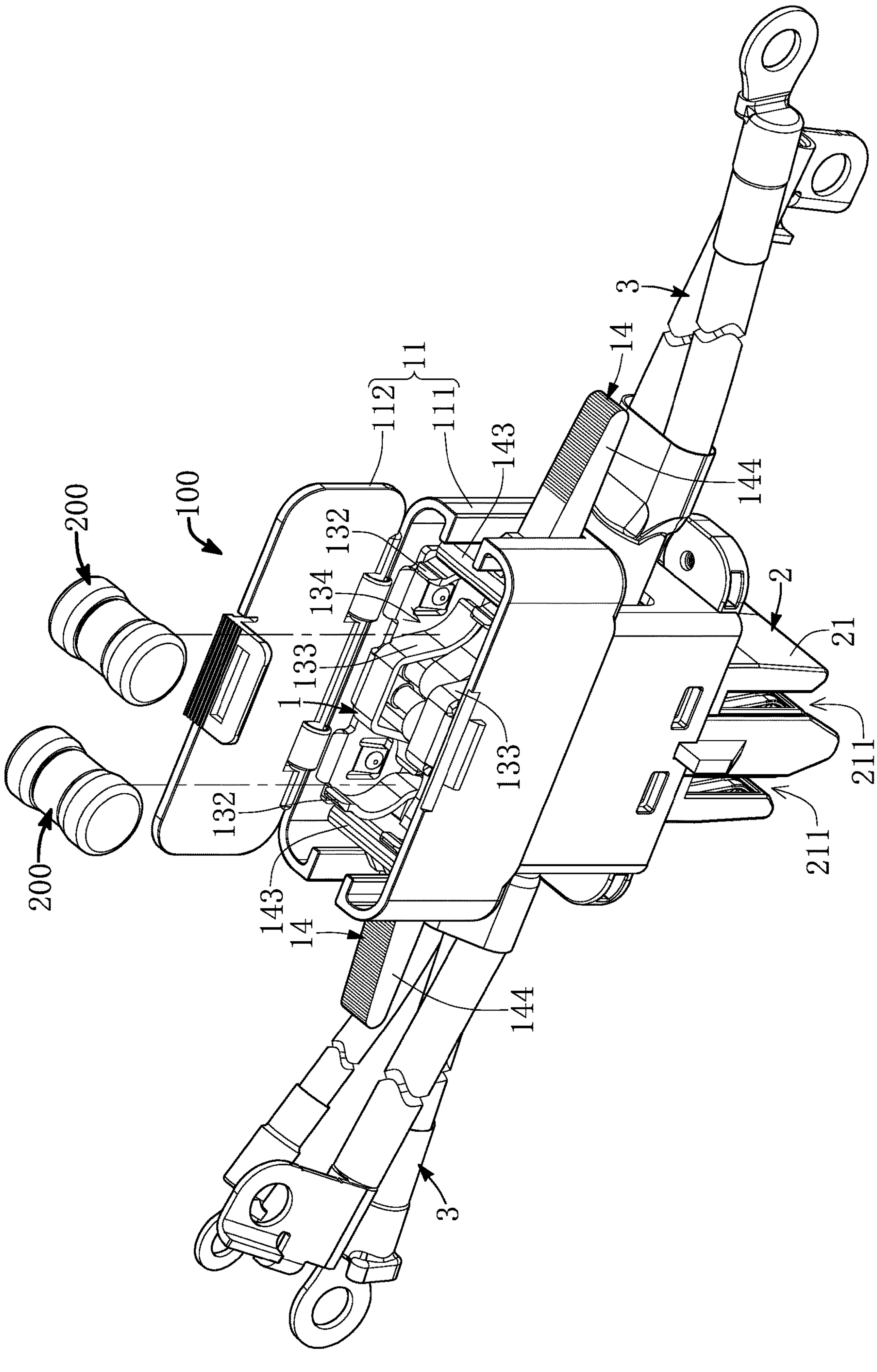
FIG. 3 is a schematic exploded view of the connector assembly and two fuses according to the present disclosure.
Figure 4:
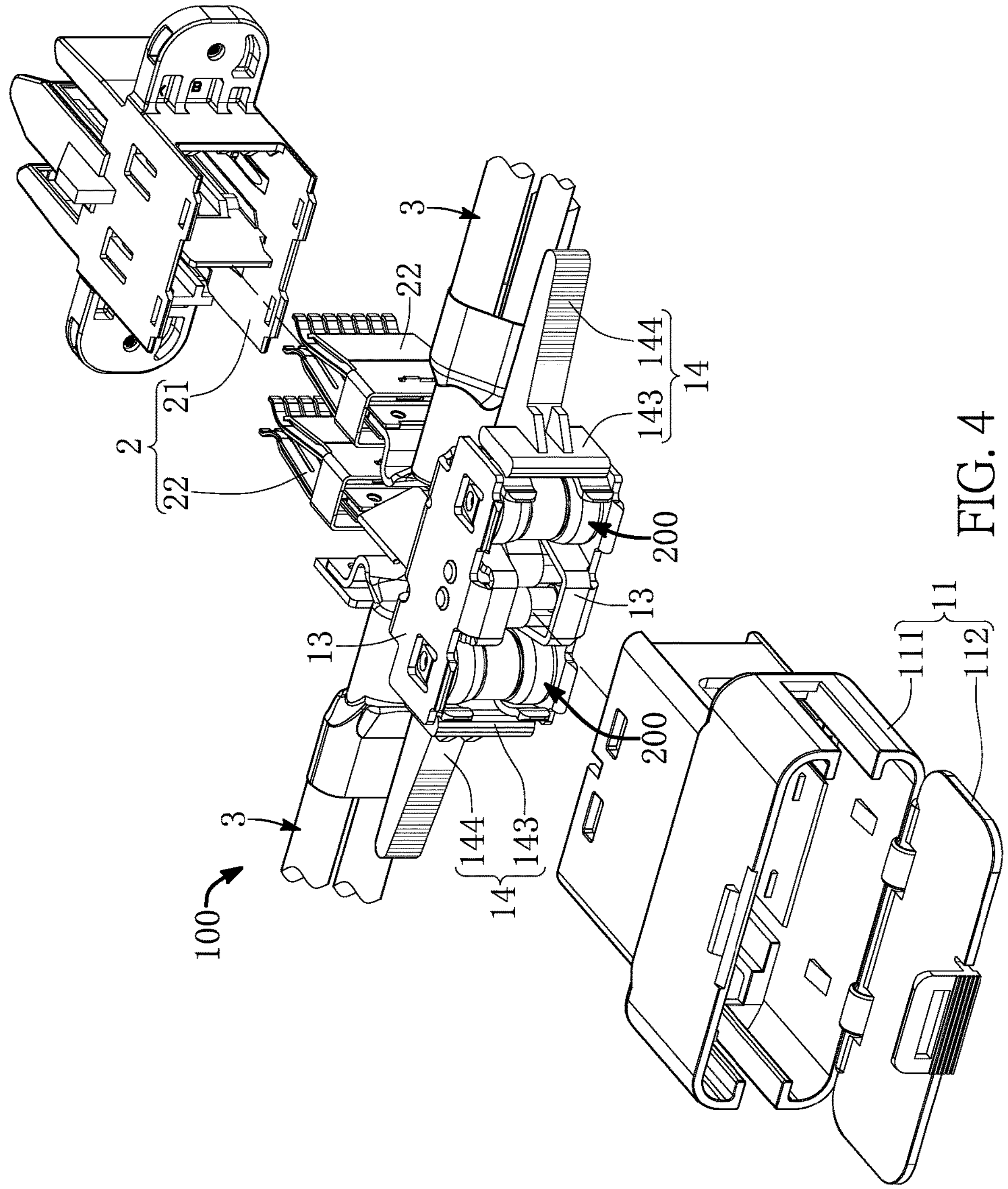
FIG. 4 is a schematic exploded view of the connector assembly according to the present disclosure.
Figure 5:
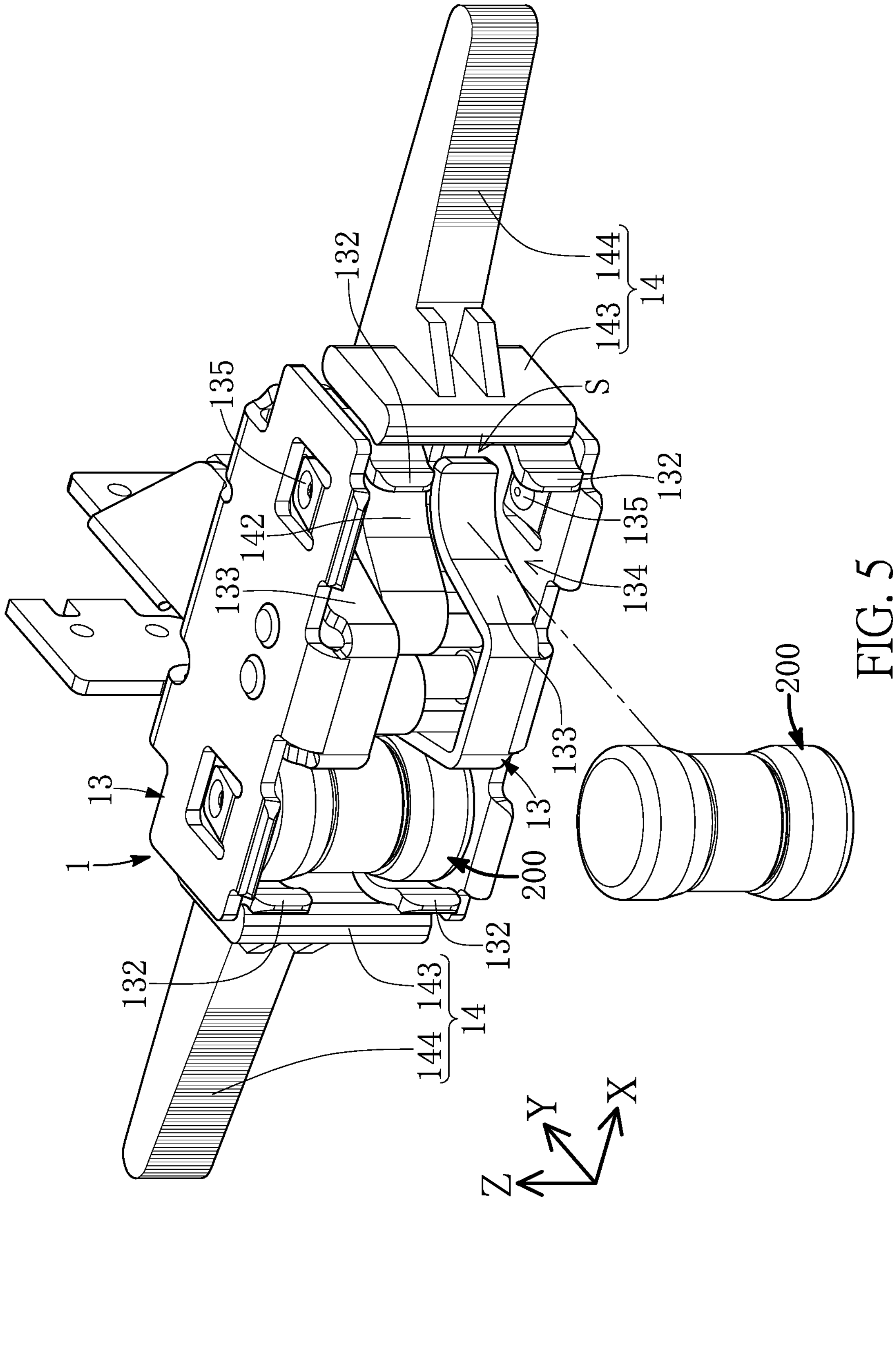
FIG. 5 is a schematic view showing a fuse carrying mechanism carrying one of the two fuses according to the present disclosure.

Referring to FIG. 1 to FIG. 5, FIG. 1 and FIG. 2 are schematic views showing a connector assembly having a cover body being closed and open according to the present disclosure. FIG. 3, FIG. 4, and FIG. 5 are respectively a schematic exploded view showing the connector assembly and two fuses, a schematic exploded view of the connector assembly, and a schematic view showing a fuse carrying mechanism carrying one of the two fuses according to the present disclosure.

The present disclosure provides a connector assembly 100. The connector assembly 100 includes a fuse carrying mechanism 1, a connector 2, and a plurality of connection cables 3. The connector 2 includes an insulating base 21 and two connection terminal assemblies 22. The two connection terminal assemblies 22 are spaced apart from each other and electrically isolated from each other. The fuse carrying mechanism 1 has two conductive components 13. One of the two connection terminal assemblies 22 is electrically connected to at least one of the connection cables 3, and another one of the two connection terminal assemblies 22 is electrically connected to one of the conductive components 13 of the fuse carrying mechanism 1. Another one of the conductive components 13 of the fuse carrying mechanism 1 is connected to the other connection cables 3. The two connection terminal assemblies 22 are electrically connected to two different power sources (or potentials), respectively. The insulating base 21 can include an insertion slot, and the two connection terminal assemblies 22 are arranged in two sides of the insertion slot. Or, as shown in FIG. 1, the insulating base 21 can further include two insertion slots 211 and the two connection terminal assemblies 22 are respectively arranged in the two insertion slots 211.

As shown in the figures of the present embodiment, the connector assembly 100 can carry two fuses 200, but a quantity of the fuses 200 that is carried by the connector assembly 100 is not limited thereto. In a different embodiment, the connector assembly 100 can carry only a single fuse 200, or the connector assembly 100 can carry at least three fuses 200. In other words, the fuse carrying mechanism 1 carries one or more than one fuses and electrically connects to one connection terminal assembly 22 and at least one connection cable 3. When a current passing through the connection terminal assembly 22 and the at least one connection cable 3 is greater than a rated current of the fuse, the fuse will break to protect a circuit.

As shown in FIG. 4 to FIG. 7, FIG. 6 and FIG. 7 are respectively a schematic exploded view of the fuse carrying mechanism and a schematic top view of a conductive component of the fuse carrying mechanism and the two fuses according to the present disclosure.

The fuse carrying mechanism 1 includes an insulating case, the two conductive components 13, and two movable components 14. In this embodiment, the insulating case includes an insulating shell 11 and an insulating body 12. Each of the insulating shell 11, the insulating body 12, and an insulating base 21 of the connector 2 can be an independent component; or, the insulating case and the insulating base 21 can be integrally formed as a single piece structure, and the insulating case extends from one side of the insulating base 21. A quantity of the conductive components 13 and a quantity of the movable components 14 included in the fuse carrying mechanism 1 is not limited to being two. In a different embodiment, a quantity of the conductive components 13 and a quantity of the movable components 14 in the fuse carrying mechanism 1 can be only one. The movable components 14 are used as a quick-release mechanism for removing one or more than one fuses assembled in the connector assembly 100.

The insulating shell 11 can include a shell body 111 and a cover body 112. The cover body 112 is detachably or rotatably connected to the shell body 111. The insulating body 12 and the two conductive components 13 are arranged in the shell body 111, one part of each of the two movable components 14 is arranged in the shell body 111, and another part of each of the two movable components 14 is exposed from the shell body 111 for facilitating a user's manipulation. The cover body 112 and the shell body 111 respectively include two engaging structures. When the engaging structures of the cover body 112 and the shell body 111 are engaged with each other, the cover body 112 and the shell body 111 can jointly define a substantially enclosed space. The insulating shell 11 is mainly configured to shield the conductive components 13, thereby preventing the conductive components 13 from being directly exposed.

Figure 6:
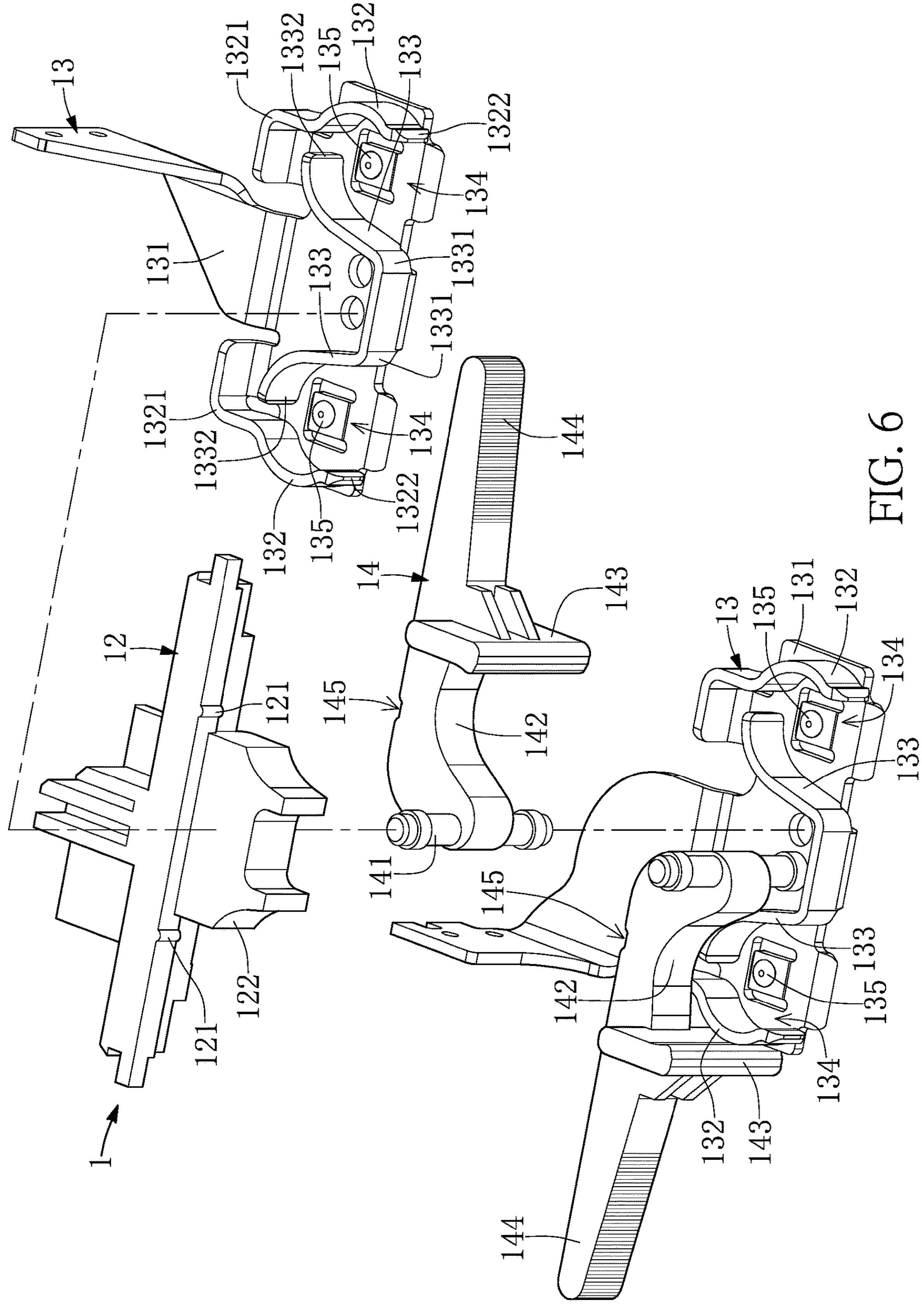
FIG. 6 is a schematic exploded view of the fuse carrying mechanism according to the present disclosure.

The two conductive components 13 are spaced apart from two sides of the insulating body 12 (e.g., the two conductive components 13 are arranged at an upper side and a lower side of the insulating body 12 along the Z-axis direction as shown in FIG. 5), and a gap S is defined between the two conductive components 13. The fuse 200 is disposed between the two conductive components 13, and two ends of the fuse 200 are respectively electrically connected to the two conductive components 13. As shown in FIG. 5 and FIG. 6, in practice, each of the conductive components 13 includes two elastic clamping structures 135 that are provided to clamp the fuse 200. When the fuse 200 is disposed between the two conductive components 13 facing each other and the fuse carrying mechanism 1 is in a clamping mode, the two elastic clamping structures 135 are elastically deformed by being pushed from the fuse 200, and the fuse 200 is clamped by the two elastic clamping structures 135 along the z-axis direction as shown in the figures. Accordingly, the two conductive components 13 can be electrically connected to the fuse 200, and further limit a range of the movement of the fuse 200 in accommodating slots 134 thereof. Each of the conductive components 13 further has a conductive body 131 and two accommodating slots 134. Each of the accommodating slots 134 includes at least one elastic piece. In the present embodiment, the accommodating slot 134 is defined by an elastic arm 132 and an auxiliary elastic arm 133, and a shape of an inner side of the accommodating slot 134 is substantially identical to a shape of an outer side of one of the two ends (e.g., two end conductive portions) of the fuse 200. The two accommodating slots 134 are spaced apart from each other. Each of the accommodating slots 134 is configured to accommodate at least one part of the fuse 200. Each of the accommodating slots 134 of any one of the conductive components 13 faces toward one of the accommodating slots 134 of another one of the conductive components 13, and the two accommodating slots 134 that faces toward each other can jointly receive one of the fuses 200. The two accommodating slots 134 and the two elastic clamping structures 135 can clamp the fuse 200 and are electrically connected to the fuse 200. In practice, either the two accommodating slots 134 or the two elastic clamping structures 13 can be selectively applied in the connector assembly 100. If the two accommodating slots 134 and the two elastic clamping structures 135 are used, the contact area between the conductive component 13 and the fuse 200 can be increased for allowing a larger current to pass therethrough.

One end of each of the elastic arms 132 is a root portion 1321 that is connected to the conductive body 131, and another end of each of the elastic arms 132 is a free end 1322. One end of each of the auxiliary elastic arms 133 is a root portion 1331 that is connected to the conductive body 131, and another end of each of the auxiliary elastic arms 133 is a free end 1332. Each of the elastic arms 132 and each of the auxiliary elastic arms 133 can approximately be an arc-shaped upright sheet structure.

Figure 7:
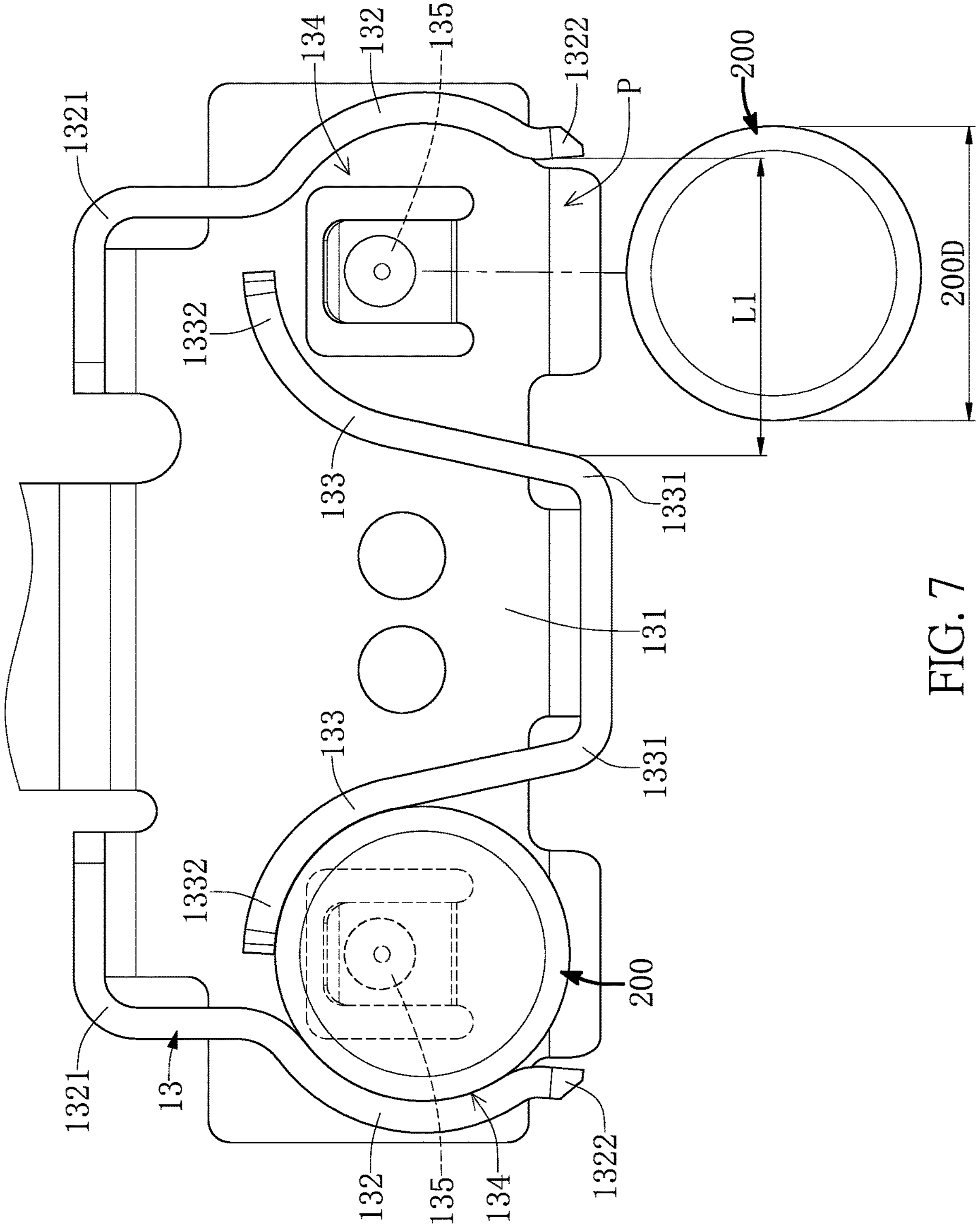
FIG. 7 is a schematic top view showing a conductive component of the fuse carrying mechanism and the two fuses according to the present disclosure.

As shown in FIG. 7, in practice, the fuse 200 can be a tube fuse. The accommodating slot 134 has an opening P that is jointly defined by the elastic arm 132 and the auxiliary elastic arm 133. The free end 1322 of the elastic arm 132 is bent towards outside. The opening P has a minimum opening distance L1 which is near a tail end of the free end 1322 that can be slightly less than a diameter 200D of the fuse 200. Through the aforementioned design, when the fuse 200 passes through the opening P, the free end 1322 of the elastic arm 132 is pushed by the fuse 200 so as to be outwardly and elastically deformed. After that, an elastic restoring force generated by the elastic deformation of the elastic arm 132 enables the fuse 200 to be effectively clamped in the accommodating slot 134 through the auxiliary elastic arm 133 and the elastic arm 132.

As shown in FIG. 5 and FIG. 6, the two movable components 14 are movably connected to the fuse carrying mechanism 1. In practice, each of the movable components 14 can be pivotally connected to the two conductive components 13 (or other structures), and the movable component 14 can be manipulated to be rotated relative to the conductive component 13, but the movement of the movable component 14 relative to the conductive component 13 is not limited thereto. In a different embodiment, the movable component 14 can be manipulated to be moved linearly or translationally relative to the conductive component 13.

It should be noted that, in the figures of the present embodiment, although the movable component 14 is movably connected to the conductive component 13, the movable component 14 is not limited to being directly connected to the conductive component 13. As long as the movable component 14 can be manipulated to move relative to the conductive component 13, it belongs to the applicable scope of the movable component 14.

Each of the movable components 14 includes a connection portion 141, a pushing portion 142, and a manipulation portion 144. The manipulation portion 144 is an insulator, and preferably the entire movable component 14 is an insulator. The connection portion 141 is movably connected to other components that can be defined as a quick-release base for allowing the movable component 14 movably relative to the two conductive components 13. In the embodiment, each of the movable components 14 is pivotally connected to the two conductive components 13. Therefore, the connection portion 141 includes a shaft structure. The connection portion 141, the pushing portion 142, and the manipulation portion 144 are connected to each other.

Each of the movable components 14 further includes an abutting structure 143 that can be formed by extending from one side of the manipulation portion 144, and the structure of the movable component 14 can be approximately an F-shaped structure. As shown in FIG. 6 and a left part of FIG. 7, when the fuse 200 is arranged in the accommodating slot 134 and the movable component 14 is arranged at a limiting position such that the fuse carrying mechanism 1 is in the clamping mode, a part of the accommodating slot 134 (e.g., the elastic arm 132) is directly pushed by the abutting structure 143 or indirectly pushed (e.g., other component(s) are between the elastic arm 132 and the abutting structure 143), and is inwardly deformed (i.e., in a direction toward a center of the accommodating slot 134). Accordingly, the elastic arm 132 can clamp the fuse 200 more tightly so as to make it more difficult for the fuse 200 to be detached from the accommodating slot 134. The other components can be a structure that is formed by extending from the insulating body 12 and that is preferably similar to an elastic arm. In other embodiments, the abutting structure 143 can be designed to abut against the elastic clamping structure 135. For example, the abutting structure 143 has side walls on the outside of the two accommodating slots 134 facing each other. When the abutting structure 143 abuts against the elastic clamping structure 135 so that the fuse carrying mechanism 1 is in the clamping mode, the elastic clamping structure 135 can tightly clamp the fuse 200 to make it more difficult for the fuse 200 to be detached therefrom. When the abutting structure 143 is manipulated to not clamp the elastic arm 132 or the elastic clamping structure 135, the fuse 200 can be separated (or detached) from the fuse carrying mechanism 1.

Figure 8:
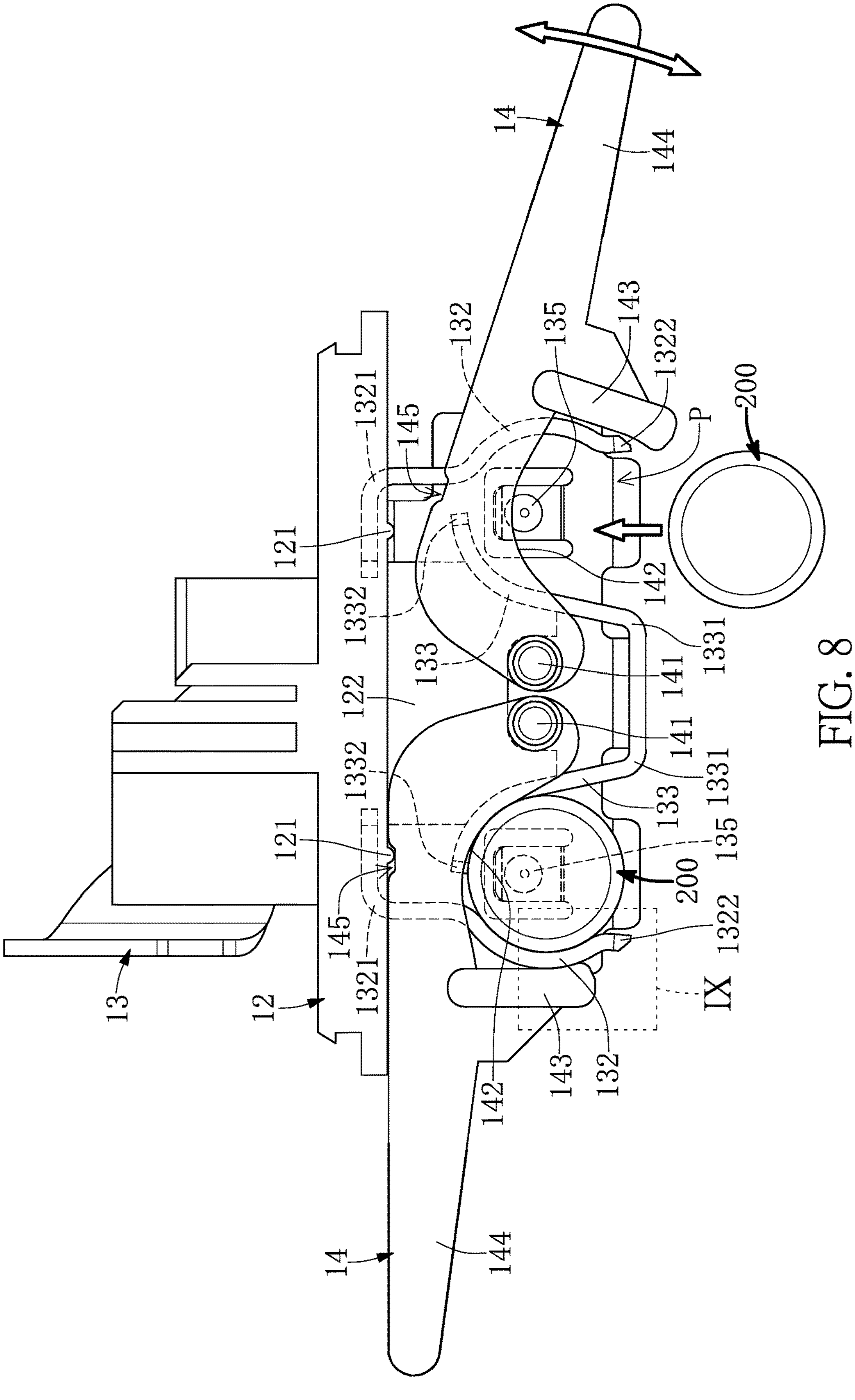
FIG. 8 is a schematic top view of the fuse carrying mechanism according to the present disclosure.

As shown in FIG. 6 and FIG. 8, in an exemplary embodiment, the insulating body 12 further includes a first engaging structure 121, and the movable component 14 includes a second engaging structure 145. When the movable component 14 is in the limiting position (as shown in a left part of the FIG. 8), the second engaging structure 145 is engaged with the first engaging structure 121. Accordingly, the movable component 14 can be maintained at the limiting position, and the movable component 14 cannot be moved relative to the insulating body 12 or the conductive component 13 such that the fuse carrying mechanism 1 to be maintained in the clamping mode. The first engaging structure 121 and the second engaging structure 145 are respectively a protrusion or a groove.

The insulating body 12 can include a limiting portion 122. The limiting portion 122 is configured to limit at least a partial segment of the accommodating slot 134 that is used for accommodating the fuse 200. As shown in FIG. 6 and FIG. 8, in the present embodiment, the limiting portion 122 is disposed adjacent to the free end 1332 of the auxiliary elastic arm 133. When the fuse 200 is arranged in the accommodating slot 134 and the movable component 14 is at the limiting position, one side of the fuse 200 is limited by the elastic arm 132 and the abutting structure 143, and another side of the fuse 200 is limited by the auxiliary elastic arm 133 and the limiting portion 122. Accordingly, the fuse 200 can be assembled and disassembled along a predetermined path, and can preferably be retained in the accommodating slot 134. In one embodiment, the limiting portion 122 may be disposed adjacent to the free end 1322 of the elastic arm 132.

Figure 9:
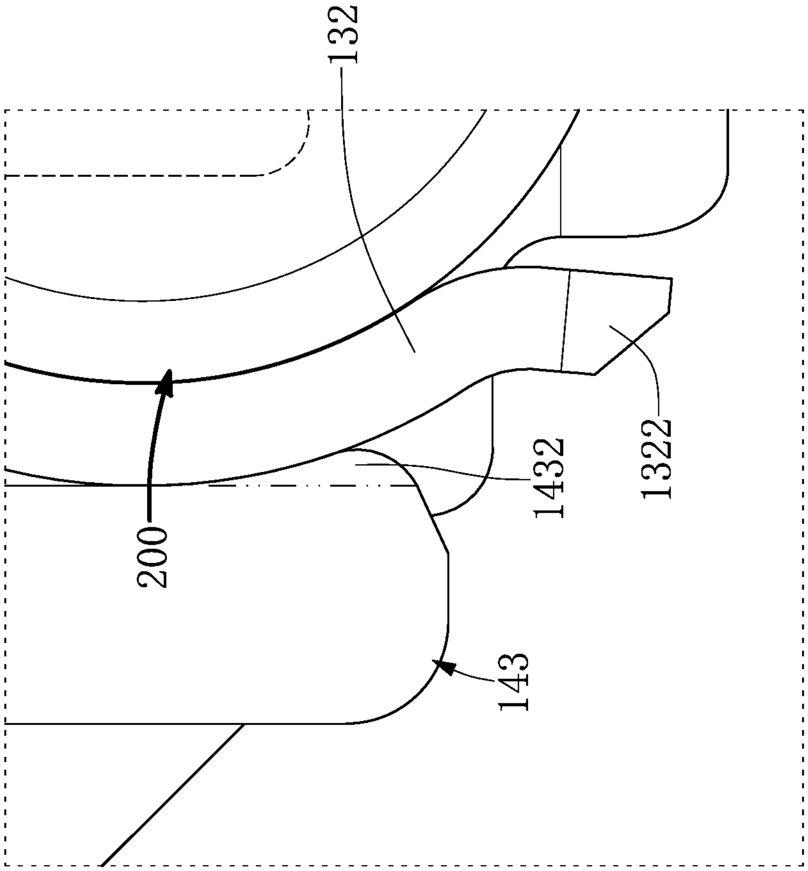
FIG. 9 is a schematic enlarged view of part IX of the FIG. 8.

As shown in FIG. 8 and FIG. 9, FIG. 8 is a schematic top view of the fuse carrying mechanism according to the present disclosure, and FIG. 9 is a schematic enlarged view of the FIG. 8. A inner surface of the abutting structure 143 has a protrusion 1432 arranged adjacent to an end of the opening P. When the abutting structure 143 is at the limiting position, the protrusion 1432 is in contact with the elastic arm 132, thereby enabling the abutting structure 143 to firmly abut against the elastic arm 132 and decreasing the opening distance L1.

Figure 10:
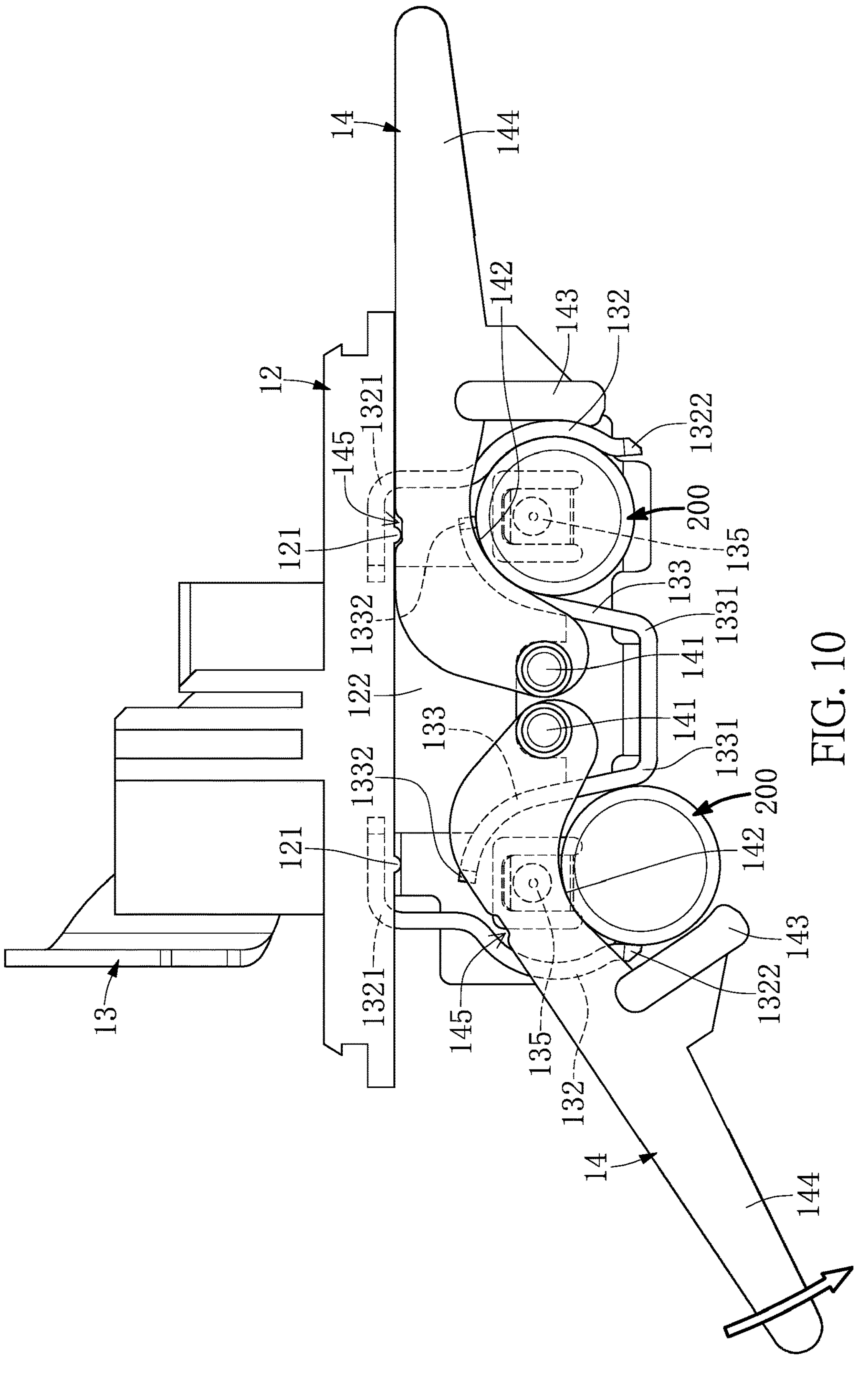
FIG. 10 is a schematic top view of the fuse carrying mechanism and the two fuses according to the present disclosure.

As shown in FIG. 5, FIG. 6, and FIG. 10, FIG. 10 is a schematic top view of the fuse carrying mechanism and the two fuses. As shown in FIG. 5 and FIG. 6, the pushing portion 142 of each of the movable components 14 is arranged between the accommodating slots 134 of the two conductive components 13 along the Z-axis direction and may also be between the elastic arm 132 and the auxiliary elastic arm 133 along an X-axis direction. In other words, the two conductive components 13 are spaced apart from each other along the z-axis direction as shown in FIG. 5.

The following description describes an operation of the movable component 14 that is used as a quick-release mechanism. As shown in FIG. 5 and FIG. 10, the manipulation portion 144 of the movable component 14 is exposed from the fuse carrying mechanism 1. When the two ends of the fuse 200 are respectively arranged in the two accommodating slots 134 and the movable component 14 is arranged at the limiting position, the user can pull the manipulation portion 144 of the movable component 14 to move (or rotate) the movable component 14 relative to the quick-release base for removing the fuse 200 from the accommodating slots 134. In this way, the pushing portion 142 of the movable component 14 can push the fuse 200 arranged in the accommodating slots 134 through a space between the two accommodating slots 134, and then the fuse 200 is pushed out of the accommodating slots 134. The pushing portion 142 has an arc-shaped area or groove for facilitating pushing the fuse 200. Along the longitudinal direction toward the fuse 200, an area of the fuse 200 pushed by the pushing portion 142 includes a center of gravity or a center of shape of the fuse 200. In other words, through a design of the two conductive components 13 and the movable component 14 of the fuse carrying mechanism 1, the user can quickly and simply pull the fuse 200 through the movable component 14 to enable the fuse 200 to be moved out of the accommodating slots 134 without the need for any tools. In some applications, the movable component 14 is provided without the manipulation portion 144, and the connection portion 141 is used as the manipulation portion. For example, the connection portion 141 extends to form an exposed part arranged outside of the quick-release base, and the user can push the exposed part of the connection portion 141, so that the movable component 14 is moved relative to the quick-release base.

It should be noted that, in the aforementioned description, the movable component 14 of the fuse carrying mechanism 1 has two functions. One of the two functions is described as follows: when the abutting structure 143 of the movable component 14 is arranged at the limiting position, the movable component 14 can push the elastic arm 132 or/and the elastic clamping structure 135, so that the elastic arm 132 or/and the elastic clamping structure 135 can firmly clamp the fuse 200. Another one of the two functions is described as follows: the movable component 14 can be manipulated to push out the fuse 200 from the accommodating slots 134 or to release the holding of the fuse 200. However, the fuse carrying mechanism 1 of the present disclosure is not limited to having both of the above two functions at the same time. In a different embodiment, the fuse carrying mechanism 1 can have only the function of removing the fuse 200 from the accommodating slots 134.

Figure 11:
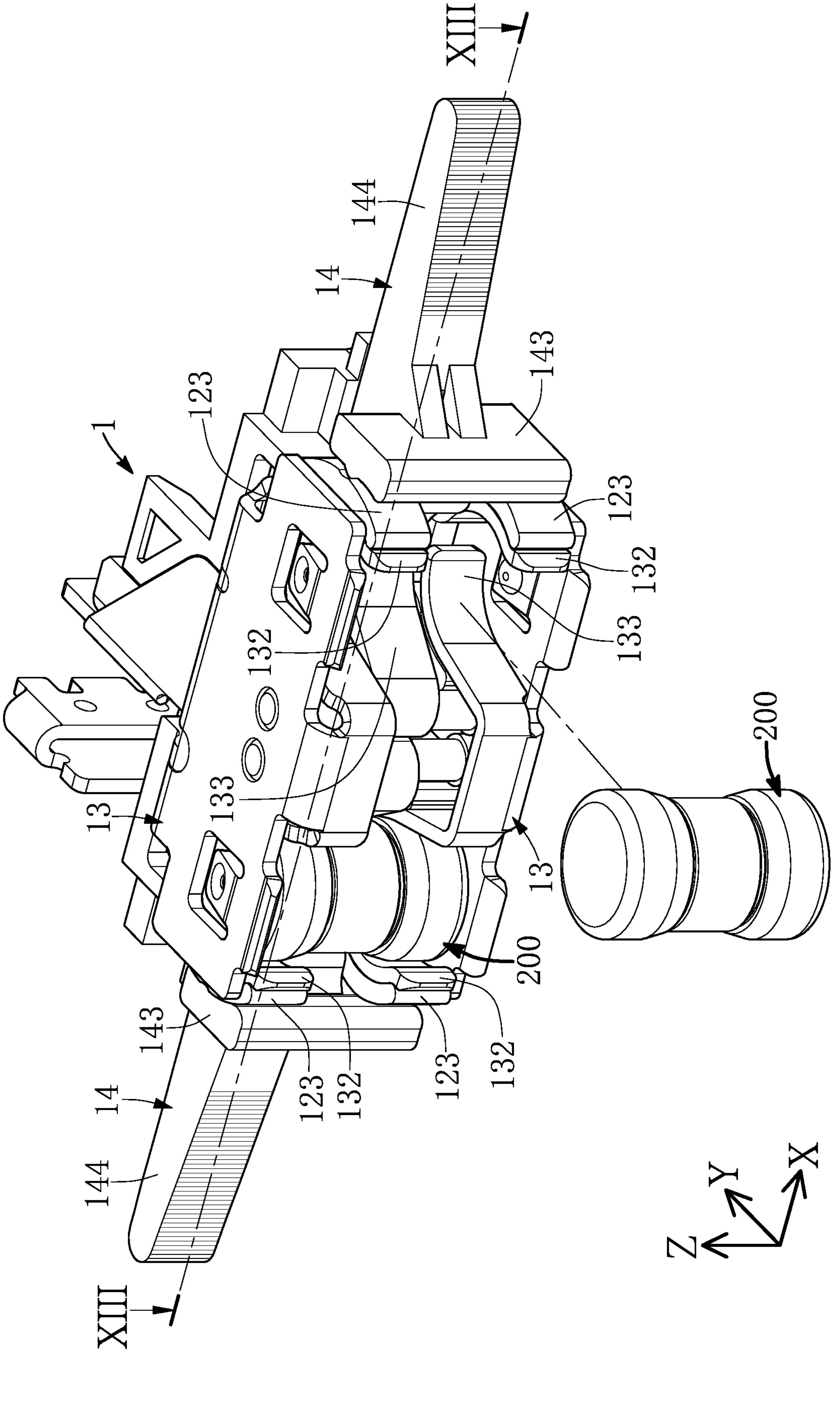
FIG. 11 and FIG. 12 are a schematic perspective view and a schematic exploded view of the fuse carrying mechanism according to another embodiment of the present disclosure.
Figure 12:
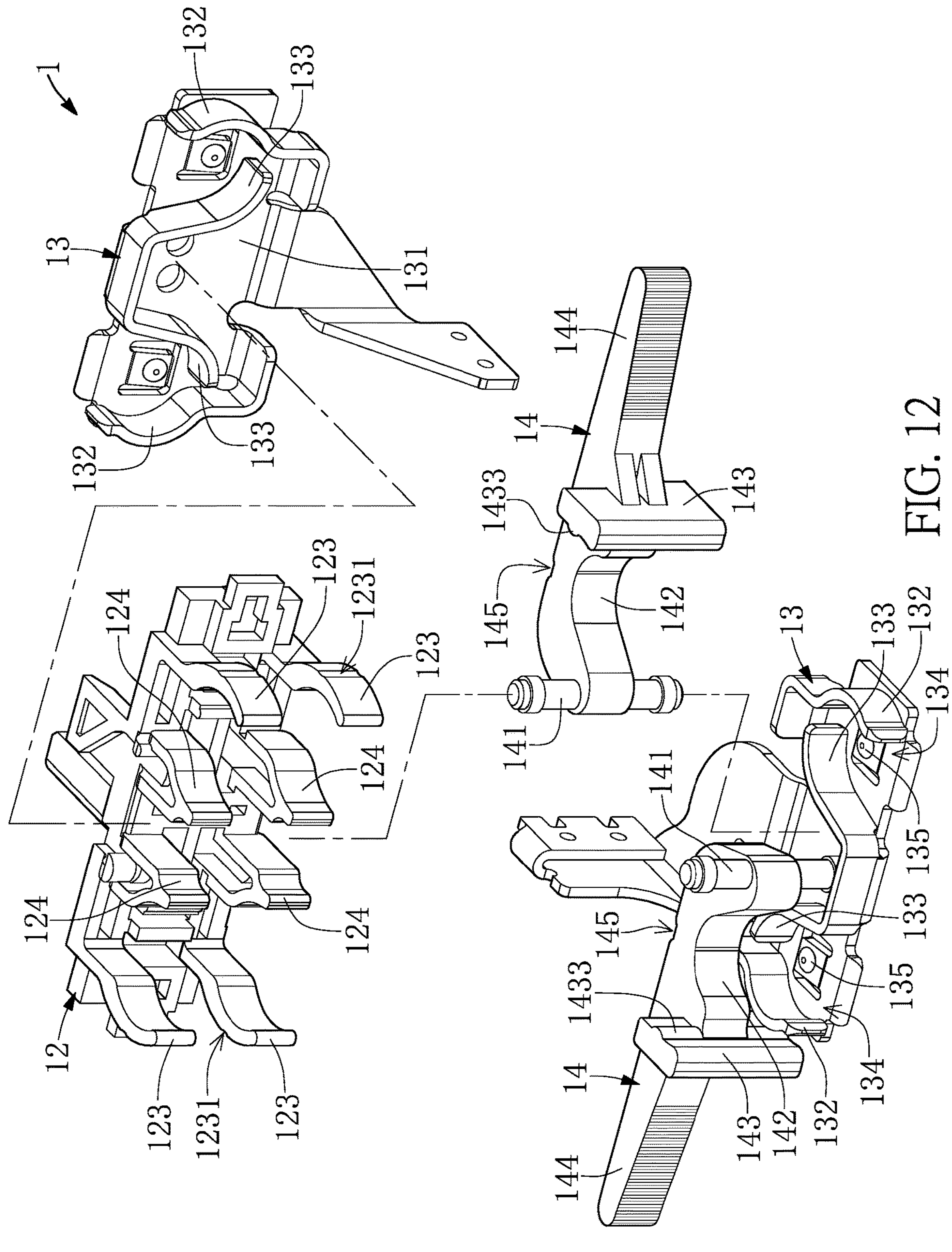
Figure 13:
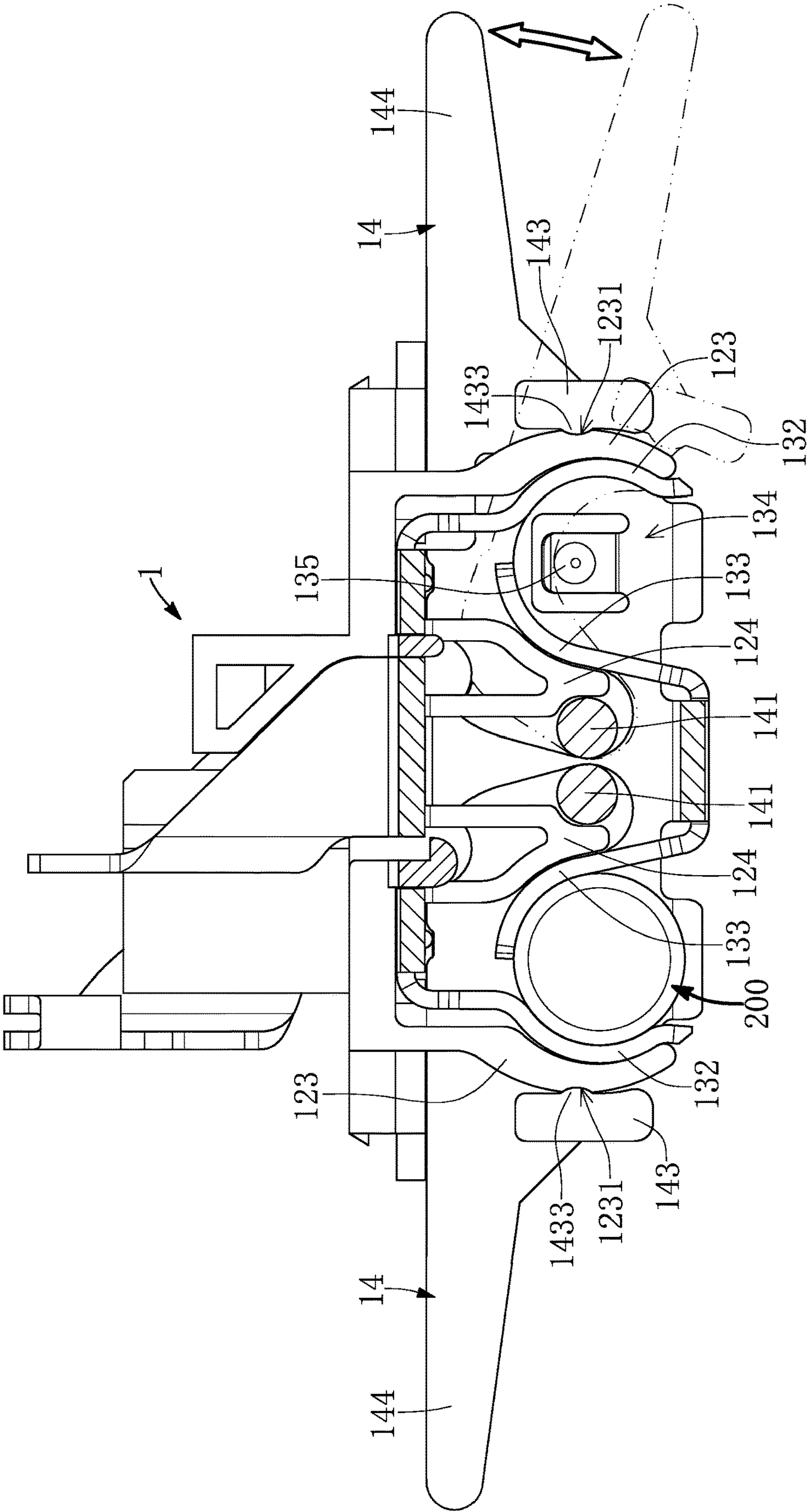
FIG. 13 is a schematic cross-sectional view taken along line XIII-XIII of FIG. 11.

As shown in FIG. 11 to FIG. 13, FIG. 11 and FIG. 12 are schematic assembled and exploded views of the fuse carrying mechanism according to another one embodiment of the present disclosure, and FIG. 13 is a schematic cross-sectional view taken along line XIII-XIII of FIG. 11. The difference between the present embodiment and the above embodiment is that the insulating body 12 further includes four auxiliary elastic structures 123, and the limiting portion 122 includes four auxiliary limiting structures 124. Each of the auxiliary elastic structures 123 can be a curved elastic sheet, the four auxiliary elastic structures 123 are arranged on two ends of the insulating body 12, and any two of the auxiliary elastic structures 123 adjacent to each other, and are respectively arranged at an upper side and a lower side thereof and are spaced apart from each other. The four auxiliary limiting structures 124 are approximately arranged on a middle of the insulating body 12, and any two of the auxiliary limiting structures 124 adjacent to each other, and are respectively arranged at an upper side and a lower side thereof and are spaced apart from each other. Each of the auxiliary elastic structures 123 can be disposed to face toward one of the auxiliary limiting structures 124.

As shown in FIG. 11 and a right half part of FIG. 13, when the two conductive components 13, the insulating body 12, and the two movable components 14 are assembled to each other, the auxiliary engaging structures 123 are respectively arranged outside of the elastic arms 132 (e.g. the auxiliary engaging structure 123 is arranged at one side of the elastic arm 132 being opposite to the auxiliary elastic arm 133), the auxiliary limiting structures 124 are respectively arranged outside of the auxiliary elastic structure 133 (e.g. the auxiliary limiting structure 124 is arranged at one side of the auxiliary elastic arm 133 being opposite to the elastic arm 132).

As shown in a left half part of FIG. 13, when the fuse 200 is inserted into the fuse carrying mechanism 1 and the movable component 14 is at the limiting position, the auxiliary elastic structure 123 is arranged between the abutting structure 143 and the elastic arm 132, and the abutting structure 143 abuts against the auxiliary elastic structure 123 to enable the auxiliary elastic structure 123 to be elastically deformed in the direction toward the elastic arm 132 so as to indirectly abut against the elastic arm 132, thereby firmly holding the fuse 200.

In an exemplary implementation, the auxiliary elastic structure 123 further has a first auxiliary engaging structure 1231 arranged on an outer side thereof, and the abutting structure 143 has a second auxiliary engaging structure 1433 arranged on an inner side thereof. As shown in the left half part of FIG. 13, when the movable component 14 is arranged at the limiting position, the first auxiliary engaging structure 1231 is engaged with the second auxiliary engaging structure 1433. Accordingly, the movable component 14 located at the limiting position can be further prevented from being shaken or leaving the limiting position when being affected by an unexpected force.

In summary, through the aforementioned design of the fuse carrying mechanism 1, the connector assembly 100 of the present disclosure allows the user to quickly and simply pull the fuse 200 through the movable component 14 to enable the fuse 200 to be moved out of the connector assembly 100 without using any tools. Specifically, as shown in FIG. 1 and FIG. 2, the user only needs to open the cover body 112 and then rotate the movable component 14 in the direction toward the cover body 112, so that the fuse 200 can be pushed out the accommodating slot 134. Conversely, if the user want to insert the fuse 200 into the connector assembly 100, the user only needs to open the cover body 112 and slightly pull the movable component 14 to release the pushing of the abutting structure 143 to the elastic arm 132 and/or the elastic clamping structure 135, and then pushes the fuse 200 into the accommodating slot 134 of the fuse carrying mechanism 1. During that the fuse 200 is being pushed into the accommodating slot 134, the fuse 200 drives the movable component 14 to be rotated until at the limiting position. Finally, the user only needs to confirm that the second engaging structure 145 of the movable component 14 is engaged with the first engaging structure 121 of the insulating body 12, such as to complete the installation of the fuse 200.

However, the aforementioned descriptions are for exemplary purposes only, and are not meant to limit the scope of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A fuse carrying mechanism, comprising:

at least one conductive component including an elastic arm and an auxiliary elastic arm, wherein the auxiliary elastic arm and the elastic arm jointly define an accommodating slot and jointly form an opening on one side of the accommodating slot; and at least one movable component, wherein a part of the movable component is movably connected to the conductive component, and the movable component includes an abutting structure;

wherein, when a fuse is arranged in the accommodating slot and the movable component is arranged at a limiting position, the abutting structure abuts against the elastic arm, such that the elastic arm is inwardly and elastically deformed.

2. The fuse carrying mechanism according to claim 1, wherein, when the movable component leaves the limiting position, the movable component pushes the fuse arranged in the accommodating slot such that the fuse is moved out of the accommodating slot.

3. The fuse carrying mechanism according to claim 2, wherein the movable component further includes a manipulation portion and a pushing portion, and wherein, when the manipulation portion is manipulated to cause the movable component to leave the limiting position, the pushing portion pushes the fuse such that the fuse is moved out of the accommodating slot.

4. The fuse carrying mechanism according to claim 1, wherein the fuse carrying mechanism includes an insulating body, wherein the conductive component is fixed to the insulating body, the insulating body includes a first engaging structure, and the movable component includes a second engaging structure, and wherein, when the movable component is arranged at the limiting position, the second engaging structure and the first engaging structure are engaged with each other.

5. The fuse carrying mechanism according to claim 1, wherein a minimum opening distance of the opening is less than a diameter of the fuse, and the fuse is a tube fuse.

6. The fuse carrying mechanism according to claim 1, wherein an inner side of the abutting structure has a protrusion, and wherein, when the fuse is arranged in the accommodating slot and the movable component is arranged at the limiting position, the protrusion is arranged adjacent to the opening and directly or indirectly abuts against the elastic arm.

7. The fuse carrying mechanism according to claim 1, wherein a quantity of the conductive components in the fuse carrying mechanism is two, the fuse carrying mechanism includes an insulating body, the two conductive components are spaced apart from each other and are arranged in the insulating body, and the accommodating slots of the two conductive components jointly receive the fuse, and wherein the movable component is pivotally connected to the two conductive components.

8. The fuse carrying mechanism according to claim 7, wherein the insulating body further includes at least one auxiliary elastic structure, the at least one auxiliary elastic structure is arranged at an outer side of each of the accommodating slots, and wherein, when the movable component is arranged at the limiting position, the at least one auxiliary elastic structure is arranged between the abutting structure and the accommodating slots, the at least one auxiliary elastic structure is pushed by the abutting structure so as to be elastically deformed.

9. The fuse carrying mechanism according to claim 8, wherein the at least one auxiliary elastic structure has at least one first auxiliary engaging structure arranged on an outer side thereof, and the abutting structure has at least one second auxiliary engaging structure arranged on an inner side thereof, and wherein, when the movable component is arranged at the limiting position, the at least one first auxiliary engaging structure and the at least one second auxiliary engaging structure are engaged with each other.

10. A connector assembly, comprising:

a connector including:

an insulating base;

a plurality of connection cables; and two connection terminal assemblies disposed in the insulating base, wherein the two connection terminal assemblies are spaced apart from each other and electrically isolated from each other, and one of the two connection terminal assemblies is electrically connected to at least one of the connection cables; and a fuse carrying mechanism connected to the connector and including:

two conductive components, wherein another one of the two connection terminal assemblies is connected to one of the two conductive components, and another one of the two conductive components is connected to the other ones of the connection cables, wherein each of the two conductive components has an accommodating slot, and wherein each of the two conductive components further includes an elastic arm and an auxiliary elastic arm, the auxiliary elastic arm and the elastic arm of each of the two conductive components jointly define the accommodating slot and jointly form an opening on one side of the accommodating slot for allowing one of the two ends of the fuse to enter into the accommodating slot; and a movable component including an abutting structure, wherein a part of the movable component is movably connected to one of the two conductive components; wherein, when two ends of a fuse are respectively arranged in the accommodating slots of the two conductive components and the movable component is arranged at a limiting position, the abutting structure abuts against the elastic arm of one of the two conductive components such that the elastic arm of one of the two conductive components is inwardly and elastically deformed.

11. The connector assembly according to claim 10, wherein the insulating base further includes an insertion slot, and the two connection terminal assemblies are arranged in two sides of the insertion slot.

12. The connector assembly according to claim 10, wherein the connector assembly further includes a shell body, the two conductive components are disposed in the shell body, and a part of the movable component is exposed from the shell body.

13. The connector assembly according to claim 12, wherein the connector assembly further includes a cover body, the cover body is detachably or rotatably connected to the shell body, and the cover body and the shell body respectively include two engaging structures, and wherein, when the two engaging structures are engaged with each other, the cover body and the shell body jointly define an enclosed space.

14. The connector assembly according to claim 10, wherein the movable component further includes a pushing portion, and wherein, when the movable component leaves the limiting position, the pushing portion pushes the fuse by passing through a space between the accommodating slots such that the fuse is moved out of the accommodating slots.

15. The connector assembly according to claim 10, wherein the fuse carrying mechanism further includes an insulating body, the two conductive components are fixed in the insulating body, the insulating body includes a first engaging structure, and the movable component includes a second engaging structure, and wherein, when the movable component is arranged at the limiting position, the second engaging structure and the first engaging structure are engaged with each other.

16. The connector assembly according to claim 10, wherein the abutting structure has a protrusion arranged on an inner side thereof, and wherein, when the fuse is arranged in the accommodating slots and the movable component is arranged at the limiting position, the protrusion directly or indirectly abuts against the accommodating slots such that the accommodating slots are inwardly and elastically deformed.

* * * * *